(12) United States Patent
Tanabe et al.

(10) Patent No.: US 7,539,292 B2
(45) Date of Patent: May 26, 2009

(54) CONTENTS DISTRIBUTION SYSTEM, CONTENTS SERVER, CONTENTS RECEIVING APPARATUS, CONTENTS DISTRIBUTION METHOD, PROGRAM AND STORAGE MEDIA

(75) Inventors: Takumi Tanabe, Hyogo (JP); Kazuhide Sawabe, Fukuoka (JP)

(73) Assignee: Panasonic Corporation, Osaka (JP)

( * ) Notice: Subject to any disclaimer, the term of this patent is extended or adjusted under 35 U.S.C. 154(b) by 534 days.

(21) Appl. No.: 10/574,711

(22) PCT Filed: Nov. 11, 2004

(86) PCT No.: PCT/JP2004/016765

§ 371 (c)(1),
(2), (4) Date: Apr. 6, 2006

(87) PCT Pub. No.: WO2005/048117

PCT Pub. Date: May 26, 2005

(65) Prior Publication Data

US 2007/0083663 A1     Apr. 12, 2007

(30) Foreign Application Priority Data

Nov. 13, 2003  (JP) .............................. 2003-384277

(51) Int. Cl.
*H04M 11/00* (2006.01)
(52) U.S. Cl. ..................................... 379/90.01; 709/230
(58) Field of Classification Search ......... 709/201–203, 709/208–219, 227–237
See application file for complete search history.

(56) References Cited

U.S. PATENT DOCUMENTS 5,337,360 A * 8/1994 Fischer ........................ 713/176
(Continued)

FOREIGN PATENT DOCUMENTS

JP      09-134367 A    5/1997
(Continued)

OTHER PUBLICATIONS

R. Fielding, "Hypertext Transfer Protocol—HTTP/1.1" RFC2616, Jun. 1999.
(Continued)

*Primary Examiner*—Curtis Kuntz
*Assistant Examiner*—Maria El-Zoobi
(74) *Attorney, Agent, or Firm*—RatnerPrestia

(57) ABSTRACT

In a network system for transmitting and receiving contents with one or more pieces of additional information corresponding to an internal attribute of the contents, a contents server can decide the data to be transmitted without regard to a division transfer method supposed for a contents receiving apparatus. The contents server includes storage unit holding one or more contents, contents data acquisition unit receiving a data request including request range information of the contents out of consideration for the additional information and extracting the data of the contents in a requested range out of the storage unit, and transmitting unit transmitting the extracted data of the contents with the additional information. The contents receiving apparatus includes receiving unit receiving the data of the contents with the additional information that are transmitted from the transmitting unit, received data decision unit deciding a receiving request range of the contents out of consideration for the additional information, and data request transmitting unit transmitting the data request including request range information.

16 Claims, 14 Drawing Sheets

U.S. PATENT DOCUMENTS

| | | | | |
|---|---|---|---|---|
| 5,727,159 A | * | 3/1998 | Kikinis | 709/246 |
| 5,742,905 A | * | 4/1998 | Pepe et al. | 455/461 |
| 5,748,613 A | * | 5/1998 | Kilk et al. | 370/231 |
| 5,963,550 A | * | 10/1999 | Hirata et al. | 370/349 |
| 6,014,691 A | * | 1/2000 | Brewer et al. | 709/217 |
| 6,370,620 B1 | * | 4/2002 | Wu et al. | 711/132 |
| 6,434,609 B1 | * | 8/2002 | Humphrey | 709/218 |
| 6,473,609 B1 | * | 10/2002 | Schwartz et al. | 455/406 |
| 6,874,017 B1 | * | 3/2005 | Inoue et al. | 709/217 |
| 2004/0230648 A1 | * | 11/2004 | Teh et al. | 709/203 |
| 2005/0120076 A1 | * | 6/2005 | Kamata et al. | 709/203 |
| 2008/0104167 A1 | * | 5/2008 | Cohen et al. | 709/203 |

FOREIGN PATENT DOCUMENTS

| | | |
|---|---|---|
| JP | 09-214482 A | 8/1997 |
| JP | 11-194999 A | 7/1999 |
| JP | 2001-101091 A | 4/2001 |
| JP | 2002-199344 | 7/2002 |
| JP | 2003-259316 A | 9/2003 |

OTHER PUBLICATIONS

"DTCP vol. I Supplement E Mapping DTCP to IP (Information Version)" Revision 1.0, Nov. 24, 2003.

International Search Report for application No. PCT/JP2004/016765 dated Feb. 22, 2005.

* cited by examiner

Message 1
```
GET /hoge.exe HTTP/1.1
Accept */*
Host: server
Range: bytes=0-5999
X-Real-Range: bytes=0-5959
Connection: Keep-Alive
```

Message 2
```
HTTP/1.1 206 Partial Content
Content-Range: bytes 0-5999/*
Content-Length: 6000
Content-Type: application/octet-stream <message body>
```

Fig.1(d)
Message 3
```
GET /hoge.exe HTTP/1.1
Accept */*
Host: server
Range: bytes=6000-9999
X-Real-Range: bytes=5960-9939
Connection: Keep-Alive
```
Fig.1(e)
Message 4
```
HTTP/1.1 206 Partial Content
Content-Range: bytes 6000-9999/*
Content-Length: 4000
Content-Type: application/octet-stream
<message body>
```
Fig.1(f)
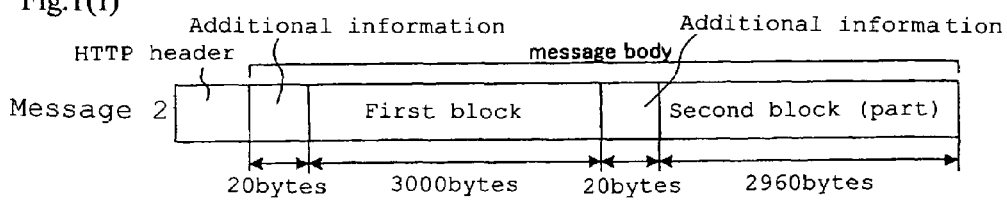
Fig.1(g)
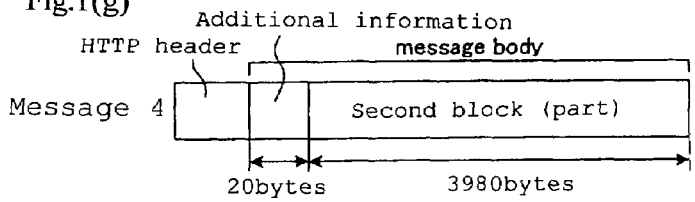
Fig.2(a)
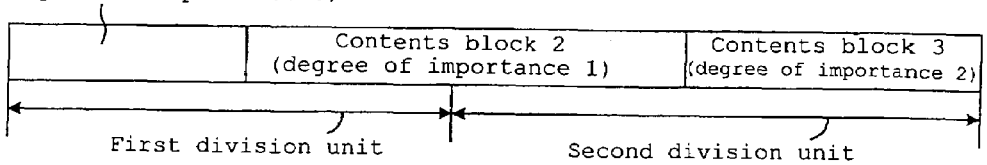
Fig.2(b)
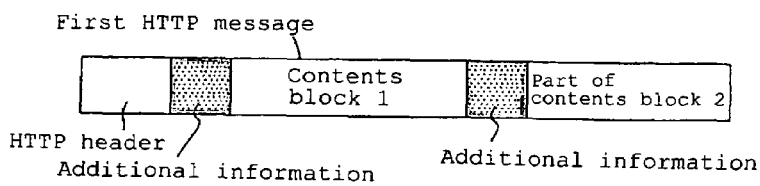

Fig.5
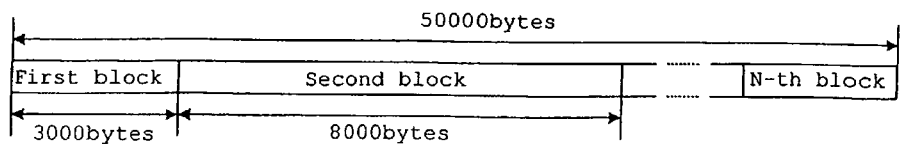
Fig.6
| Offset | Attribute |
|---:|---|
| 0 | Degree of importance 6 |
| 3000 | Degree of importance 1 |
| 11000 | Degree of importance 3 |
Fig.7
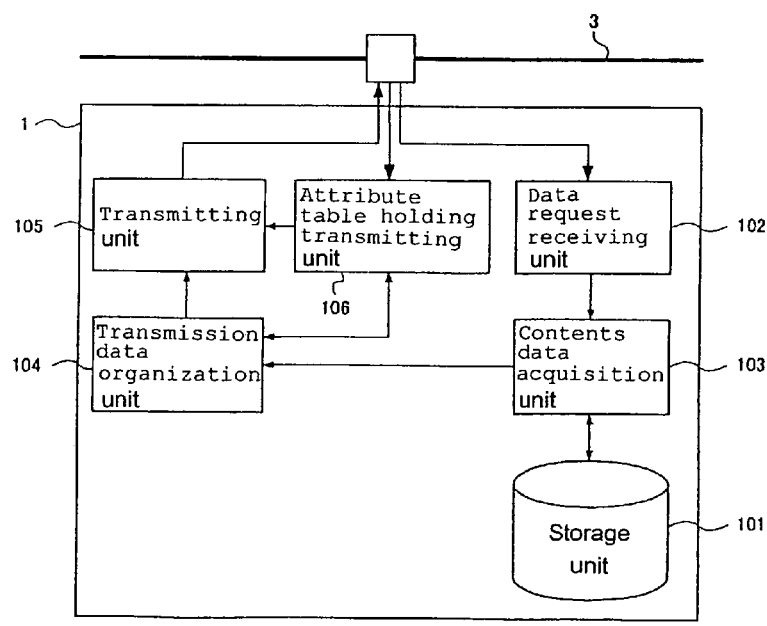

Message 1
```
GET /hogehoge.mpg HTTP/1.1
Accept video/*
Host: server
Range: bytes=0-80009
X-Real-Range: bytes=0-79999
Connection: Keep-Alive
```

Message 2
```
HTTP/1.1 206 Partial Content
Content-Range: bytes 0-80009/*
Content-Length: 80010
Content-Type: video/mpeg <message body>
```

Fig.12(d)
Message 3
```
GET /hogehoge.mpg HTTP/1.1
Accept video/*
Host: server
Range: bytes=80010-160029
X-Real-Range: bytes=80000-159999
Connection: Keep-Alive
```
Fig.12(e)
Message 4
```
HTTP/1.1 206 Partial Content
Content-Range: bytes 80010-160029/*
Content-Length: 80020
Content-Type: video/mpeg
<message body>
```
Fig.12(f)
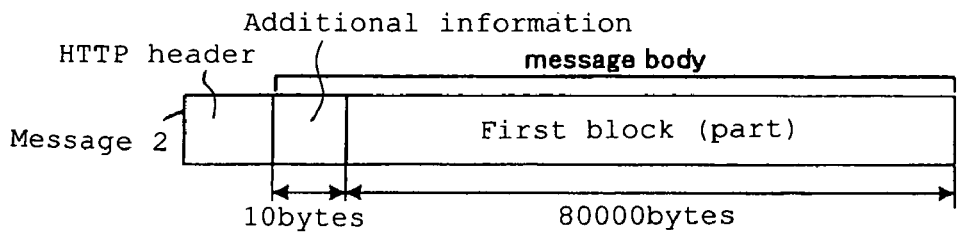
Fig.12(g)
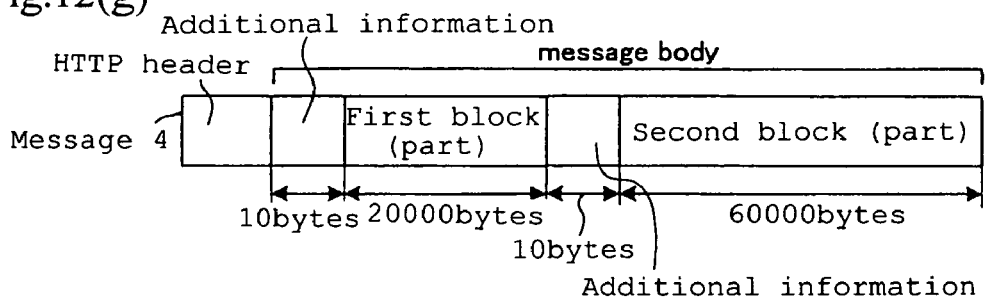

| Offset | Attribute |
|---|---|
| 0 | Copyright protection required |
| 100000 | Copyright free (encryption not required) |
| 180000 | Copyright free (encryption required) |
| ⋮ | ⋮ |

CONTENTS DISTRIBUTION SYSTEM, CONTENTS SERVER, CONTENTS RECEIVING APPARATUS, CONTENTS DISTRIBUTION METHOD, PROGRAM AND STORAGE MEDIA

This application is a U.S. national phase application of PCT International Application PCT/JP2004/16765.

TECHNICAL FIELD

The present invention relates to a contents distribution system, a contents server, a contents receiving apparatus, a contents distribution method, a program and a storage media in which the contents with the additional information concerning an internal attribute of the contents appended are distributed.

BACKGROUND ART

In receiving the contents stored in a contents server via a network, a contents receiving apparatus typically makes a request to the contents server in accordance with a communication protocol such as HTTP to receive the contents data.

However, when a request is simply issued by specifying the contents only, all the contents are transmitted to the contents receiving apparatus upon one request. Accordingly, even if there is a restriction on the reception buffer for the contents receiving apparatus to deal with the communication protocol, only a part of the contents can not be received. Also, even if the contents receiving apparatus already holds a certain part of the contents, the contents from the beginning to the last must be required.

To improve this, some communication protocols support a block transfer to allow a certain part of the contents to be acquired. For example, in an HTTP, the block transfer is implemented by including a Range header in an HTTP request message (e.g., refer to Japanese Patent Laid-Open No. 2001-101091, or R. Fielding et al., "Hypertext Transfer Protocol-HTTP/1.1", RFC2616, the entire disclosure of which are incorporated herein by reference in its entirety).

When the contents are AV contents, the AV contents can be transmitted or received in the same way as above. Especially in the case of the AV contents, the contents receiving apparatus transmits a request while checking availability of the reception buffer for storage before forwarding the AV contents to an internal decoder. In this case, the contents data is transmitted or received, employing the block transfer.

However, in transferring the contents from the contents server, the additional information may be appended to the transmission data according to a certain rule, based on an attribute of each portion of the contents, the conventional transfer method employing the block transfer has a problem that the contents receiving apparatus can not correctly request the data range to be received to the contents server. This problem with the conventional transfer method employing the block transfer will be described below.

The additional information appended to the transmission data by the contents server includes the information regarding the degree of importance for the portion of the contents, and the information regarding encryption. The additional information for the degree of importance is employed by a repeater and so on between the contents server and the contents receiving apparatus, referring to it, to control the transmission so that the contents data having the higher degree of importance may be transmitted earlier when there is a high network load, for example. The information regarding encryption is the information regarding the key, for example.

The additional information is appended every time the corresponding attribute is changed within the contents. For example, the additional information regarding the degree of importance, the additional information is appended again every time the degree of importance is changed within the contents. For each transfer unit (packet or message) of the communication protocol, the additional information is necessarily appended after the header of the communication protocol. This is made to deal with the situation where the previous packet or message is lost on the network.

FIG. 2(a) shows an example of the HTTP message in the case where the contents with the additional information appended is further transmitted in accordance with the HTTP. The contents are divided into three blocks according to the degree of importance in FIG. 2(a), but transmitted by two HTTP messages as shown in FIGS. 2(b) and 2(c).

In the first HTTP message as shown in FIG. 2(b), the HTTP header is followed by the additional information for the contents block 1, the contents block 1, the additional information for contents block 2, and a part (former half) of the contents block 2. In the second HTTP message as shown in FIG. 2(c), the HTTP header is firstly followed by the additional information for the contents block 2. This is due to a rule that the additional information is necessarily appended after the HTTP header. Further, it is followed by a part (latter half) of the contents block 2, the additional information for the contents block 3, and the contents block 3.

FIGS. 3(a) to 3(d) are examples where the same contents of FIG. 2 are transmitted by three HTTP messages. Three contents blocks are transmitted by three HTTP messages as shown in FIGS. 3(b) to 3(d).

The data transmitted as a message body (data part) of each HTTP message includes the additional information and the contents data. Since there is no distinction between the additional information and the contents data on the HTTP protocol, they are treated as data impartially, in which the data length (value of Content-Length header) included in the HTTP header is written as the sum of the length of the additional information and the length of the contents data.

When the contents receiving apparatus acquires a part of the contents from the contents server, employing the Range header of the HTTP, for example, a problem occurs if the additional information exists. The data transmitted or received by the HTTP is the contents data with the additional information. Accordingly, when the contents receiving apparatus acquires a part of the contents, it is required to specify the acquired range, supposing all the data consisting of the contents data and the additional information.

However, the total number of additional information to be transmitted or received may change, depending on a way of dividing the contents, as seen from FIGS. 2 and 3. The contents receiving apparatus transmits a request for contents according to its own division method. However, the contents server, which does not know which division method is supposed for the contents receiving apparatus, can not specify the range of contents to be actually received by the contents receiving apparatus.

Also, when the contents are AV contents and the contents receiving apparatus may reproduce the AV contents including the image and the audio, which are stored in the contents server, via the network, particularly the information concerning the copyright management may be appended as the additional information. That is, information defining that a certain part of the AV contents is permitted to be copied, but the other part must not be copied. In this case, the part that must not be copied is required to be encrypted for transmission on the network. Also, when the key is periodically updated for encryption, the information concerning the decoding may be appended as the additional information.

When the contents are AV contents, the contents receiving apparatus issues a request for acquiring a part of the AV contents, while checking the availability of the reception buffer. The way of dividing the AV contents is decided at the time of issuing the request, depending on the availability of the reception buffer. In this case, when the additional information such as the information concerning the copyright management is appended in the middle of the contents, the total data length of the AV contents with the additional information appended may change, as seen from the HTTP, depending on the way of how the contents receiving apparatus divides the AV contents. Accordingly, the contents server can not specify the range of AV contents to be actually reproduced by the contents receiving apparatus.

The above-mentioned problem may occur with a DTCP-IP (e.g., refer to DTCP Volume 1 Supplement E Mapping DTCP to IP (Informational Version) Revision 1.0 Nov. 24, 2003), for example. In the DTCP-IP, a PCP header including the copyright information and the key as the additional information is defined. The PCP header is appended every time the copyright attribute of the contents to be transmitted changes. Also, the PCP header is appended to the top (directly after the HTTP header) of each HTTP response message carrying the contents.

DISCLOSURE OF THE PRESENT INVENTION

The present invention has been achieved to solve the above-mentioned problem, and it is a purpose of the present invention to provide a contents distribution system, a contents server, a contents receiving apparatus and a contents distribution method in which the contents receiving apparatus can surely receive the contents data of a certain receiving range which is supposed by the contents server.

In order to solve the above problem, the $1^{st}$ aspect of the present invention is a contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said system comprising:

a contents server having storage unit holding one or more contents, contents data acquisition unit receiving a data request including request range information of contents out of consideration for the additional information, specifying a requested range, and extracting data of contents in said requested range from said storage unit, and transmitting unit transmitting the extracted data of said contents with said additional information appended; and a contents receiving apparatus having receiving unit receiving the data of said contents and said additional information that are transmitted from said transmitting unit, received data decision unit deciding a receiving request range of said contents out of consideration for said additional information, and data request transmitting unit transmitting said data request including decided receiving request range as request range information;

wherein said contents data acquisition unit specifies said requested range according to said data request transmitted by said data request transmitting unit.

The $2^{nd}$ aspect of the present invention is a contents server for a contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said contents server comprising:

storage unit holding one or more contents, contents data acquisition unit receiving a data request including request range information of contents out of consideration for the additional information, specifying a requested range, and extracting the data of contents in said requested range from said storage unit, and transmitting unit transmitting the extracted data of said contents with said additional information appended.

The $3^{rd}$ aspect of the present invention is the contents server according to the $2^{nd}$ aspect of the present invention, wherein said communication protocol is an HTTP, and said data request is provided with an extension header for writing said request range information of said contents out of consideration for said additional information.

The $4^{th}$ aspect of the present invention is the contents server according to the $2^{nd}$ aspect of the present invention, wherein said contents are AV contents including any one of or any combination of video, image and audio.

The $5^{th}$ aspect of the present invention is the contents server according to the $2^{nd}$ aspect of the present invention, wherein said additional information includes information concerning a state of copyright protection of said contents.

The $6^{th}$ aspect of the present invention is the contents server according to the $2^{nd}$ aspect of the present invention, wherein in the case that said contents are encrypted, said additional information includes information for decoding said encrypted contents.

The $7^{th}$ aspect of the present invention is a contents receiving apparatus in a contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said apparatus comprising:

received data decision unit deciding a receiving request range of contents out of consideration for the additional information, data request transmitting unit transmitting a data request including request range information indicating said decided receiving request range, and receiving unit receiving the data of said contents and said additional information.

The $8^{th}$ aspect of the present invention is the contents receiving apparatus according to the $7^{th}$ aspect of the present invention, wherein said receiving unit stores only the data of said contents in a reception buffer according to the received data of said contents and said additional information.

The $9^{th}$ aspect of the present invention is the contents receiving apparatus according to the $7^{th}$ aspect of the present invention, wherein said communication protocol is an HTTP, and said data request is provided with an extension header for writing said request range information of said contents out of consideration for said additional information.

The $10^{th}$ aspect of the present invention is the contents receiving apparatus according to the $7^{th}$ aspect of the present invention, wherein said contents are AV contents including any one of or any combination of video, image and audio.

The $11^{th}$ aspect of the present invention is the contents receiving apparatus according to the $7^{th}$ aspect of the present invention, wherein said additional information includes information concerning a state of copyright protection of said contents.

The 12$^{th}$ aspect of the present invention is the contents receiving apparatus according to the 7$^{th}$ aspect of the present invention, wherein in the case that said contents are encrypted, said additional information includes information for decoding said encrypted contents.

The 13$^{th}$ aspect of the present invention is a contents distribution method of transmitting and receiving contents, employing a contents server in which one or more pieces of contents are stored, and a contents receiving apparatus receiving said contents from said contents server via a network;

making said contents server perform a step of receiving a data request including request range information of contents out of consideration for additional information, specifying a requested range, and extracting data of contents in said requested range, and a step of transmitting the extracted data of said contents with said additional information appended; and making said contents receiving apparatus perform a step of deciding a receiving request range of said contents out of consideration for said additional information, a step of transmitting said data request including said decided receiving request range as said request range information, and a step of receiving the data of said data of contents and said additional information that are transmitted by said step of transmitting.

The 14$^{th}$ aspect of the present invention is a storage media usable on a computer, wherein the storage media is storing a program for the contents distribution system according to the 1$^{st}$ aspect of the present invention, wherein said program enables a computer to implement, for said contents server, storage unit holding one or more contents, contents data acquisition unit receiving said data request including said request range information of said contents out of consideration for said additional information, specifying a requested range, and extracting said data of contents in said requested range from said storage unit, and transmitting unit transmitting the extracted data of said contents with said additional information appended, and to implement, for said contents receiving apparatus, receiving unit receiving the data of said contents and said additional information that are transmitted from said transmitting unit, received data decision unit deciding a receiving request range of said contents out of consideration for said additional information, and data request transmitting unit transmitting said data request including said decided receiving request range as said request range information.

The 15$^{th}$ aspect of the present invention is a storage media usable on a computer, wherein the storage media is storing a program for the contents server according to the 2$^{nd}$ aspect of the present invention, wherein said program enables a computer to implement, for said contents server, storage unit holding one or more contents, contents data acquisition unit receiving said data request including said request range information of said contents out of consideration for said additional information, specifying a requested range, and extracting said data of contents in said requested range from said storage unit, and transmitting unit transmitting the extracted data of said contents with said additional information appended.

The 16$^{th}$ aspect of the present invention is a storage media usable on a computer, wherein the storage media is storing a program for the contents receiving apparatus according to the 7$^{th}$ aspect of the present invention, wherein said program enables a computer to implement, for said contents receiving apparatus, received data decision unit deciding said receiving request range of contents out of consideration for said additional information, data request transmitting unit transmitting said data request including said request range information indicating said decided receiving request range, and receiving unit receiving data of said contents and said additional information.

A contents distribution system, a contents server, a contents receiving apparatus, a contents distribution method, program and storage media in which the contents receiving apparatus can surely receive the contents data of a certain receiving range which is supposed by the contents server can be provided by the present invention.

BRIEF DESCRIPTION OF THE DRAWINGS

FIG. 1(d) is a diagram showing the substance of HTTP message in the contents transmitting and receiving system according to the embodiment 1 of the present invention;

FIG. 1(e) is a diagram showing the substance of HTTP message in the contents transmitting and receiving system according to the embodiment 1 of the present invention;

FIG. 1(f) is a diagram showing the format of HTTP message in the contents transmitting and receiving system according to the embodiment 1 of the present invention;

FIG. 1(g) is a diagram showing the format of HTTP message in the contents transmitting and receiving system according to the embodiment 1 of the present invention;

FIG. 2(a) is a diagram showing the format of HTTP message in dividing and transmitting the contents data;

FIG. 2(b) is a diagram showing the format of HTTP message in dividing and transmitting the contents data;

FIG. 5 is a diagram showing the format of the contents as explained in the embodiment 1 of the present invention;

FIG. 6 is a diagram showing an attribute table of the contents as explained in the embodiment 1 of the present invention;

FIG. 7 is a block diagram showing the configuration of a contents server according to the embodiment 1 of the present invention;

FIG. 12(*b*) is a diagram showing the substance of HTTP message in the contents transmitting and receiving system according to the embodiment 2 of the present invention;

FIG. 12(*c*) is a diagram showing the substance of HTTP message in the contents transmitting and receiving system according to the embodiment 2 of the present invention;

FIG. 12(*d*) is a diagram showing the substance of HTTP message in the contents transmitting and receiving system according to the embodiment 2 of the present invention;

FIG. 12(*e*) is a diagram showing the substance of HTTP message in the contents transmitting and receiving system according to the embodiment 2 of the present invention;

FIG. 12(*f*) is a diagram showing the format of HTTP message in the contents transmitting and receiving system according to the embodiment 2 of the present invention;

FIG. 12(*g*) is a diagram showing the format of HTTP message in the contents transmitting and receiving system according to the embodiment 2 of the present invention;

DESCRIPTION OF SYMBOLS

Figures 1A, 1B, 1C:
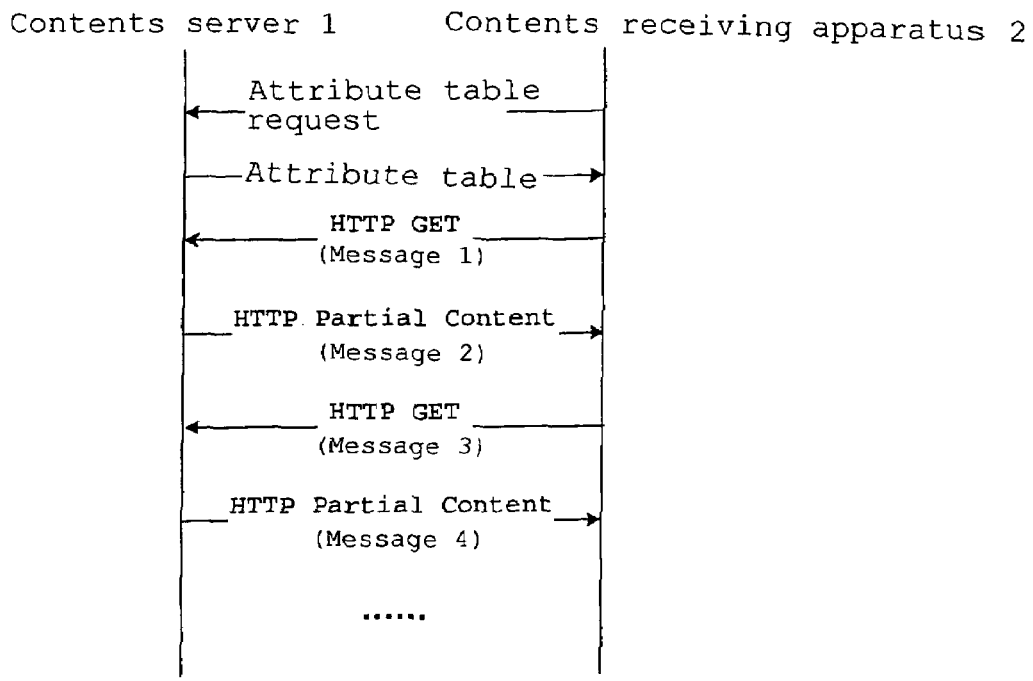
FIG. 1(a) is a sequence chart between a contents server and a contents receiving apparatus in a contents transmitting and receiving system according to an embodiment 1 of the present invention.
FIG. 1(b) is a diagram showing the substance of HTTP message in the contents transmitting and receiving system according to the embodiment 1 of the present invention.
FIG. 1(c) is a diagram showing the substance of HTTP message in the contents transmitting and receiving system according to the embodiment 1 of the present invention.
Figure 2C:
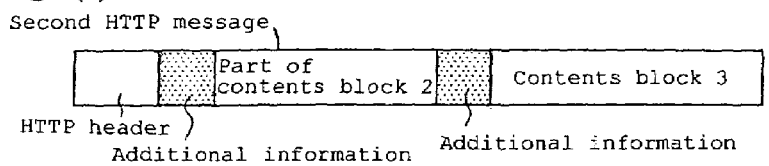
FIG. 2(c) is a diagram showing the format of HTTP message in dividing and transmitting the contents data.
Figure 3A:
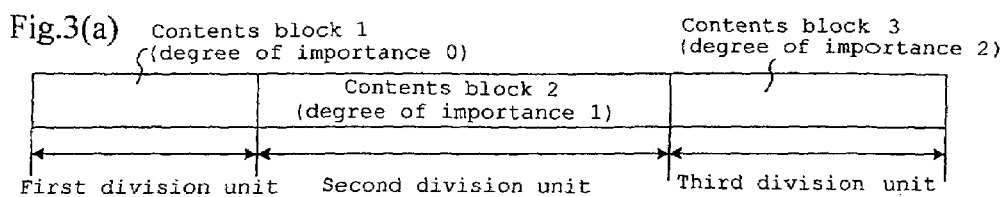
FIG. 3(a) is a diagram showing the format of HTTP message in dividing and transmitting the contents data.
Figure 3B:
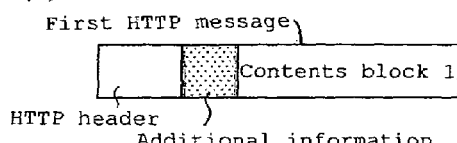
FIG. 3(b) is a diagram showing the format of HTTP message in dividing and transmitting the contents data.
Figure 3C:
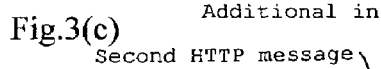
FIG. 3(c) is a diagram showing the format of HTTP message in dividing and transmitting the contents data.
Figure 3D:
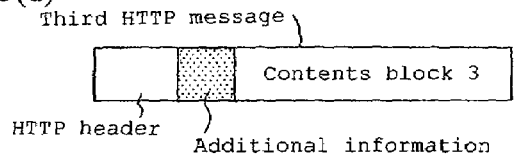
FIG. 3(d) is a diagram showing the format of HTTP message in dividing and transmitting the contents data.

1 contents server
101 storage unit
102 data request receiving unit
103 contents data acquisition unit
104 transmit data organization unit
105 transmitting unit
106 attribute table holding transmitting unit
2 contents receiving apparatus
201 user input unit
202 received data decision unit
203 data request transmitting unit
204 receiving unit
205 reception buffer
206 contents processing unit
207 attribute table holding receiving unit

3 network
13 AV server
1301 reproduction start request receiving unit
1302 AV contents data acquisition unit
1303 encryption unit
1304 encryption key generation unit
14 AV contents reproducing apparatus
1401 reproduction start request transmitting unit
1402 reproducing unit
1403 decoding unit
1404 decoding key generation unit

BEST MODE FOR CARRYING OUT THE PRESENT INVENTION

The preferred embodiments of the present invention will be described below with reference to the drawings.

Embodiment 1

Figure 4:
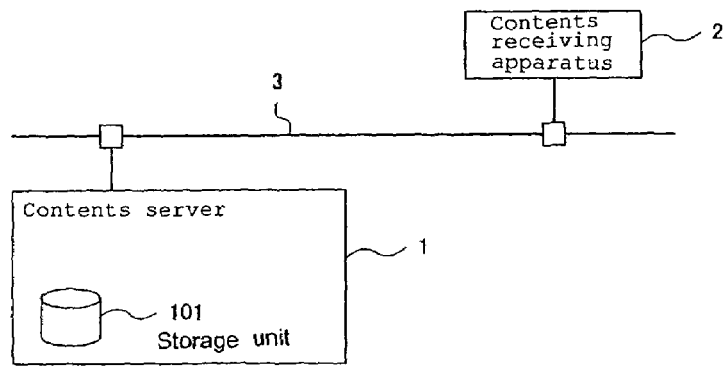
FIG. 4 is a diagram showing the configuration of a network for a contents distribution system according to the embodiment 1 of the present invention.

FIG. 4 is a diagram showing the configuration of a contents distribution system according to an embodiment 1 of the present invention.

A contents server 1 transmits the contents stored in storage unit 101 onto a network 3, upon a request from a contents receiving apparatus 2. The contents receiving apparatus 2 receives the contents from the contents server 1, and performs the processing in accordance with the substance of the contents. Examples of the contents include the text, video, image, audio and execution file or the like.

First of all, a protocol control method of designating a received data range from the contents receiving apparatus 2 to the contents server 1 in the contents distribution system of the embodiment 1 will be described below.

FIG. 1(*a*) is a sequence chart describing the transmission and reception between the contents server 1 and the contents receiving apparatus 2. In this embodiment 1, an HTTP is employed for the transmission and reception. FIGS. 1(*b*) to 1(*e*) show the substance of HTTP message, and FIGS. 1(*f*) and 1(*g*) show the format of HTTP message. The transmission and reception protocol does not matter in the present invention. FIG. 1 is an example in which an execution file hoge.exe as the contents stored in the storage unit 101 of the contents server 1 is divided and received from the beginning of the contents by the contents receiving apparatus 2.

The format of hoge.exe is shown in FIG. 5. The total size of hoge.exe is 50000 bytes, and hoge.exe is composed of several blocks with different degree of importance. The first block is 300 bytes, and the second block is 8000 bytes. The division of blocks by the degree of importance is only illustrative. The division of blocks may be made according to other attribute, or no division of blocks (all the contents are one block) may be made. Also, the total size or block size does not matter. The storage unit 101 as shown in FIG. 4 is suitably a non-volatile storage media such as a hard disk, but may be a volatile storage media.

In FIG. 1(*a*), the contents receiving apparatus 2 firstly requests an attribute table corresponding to the contents to be acquired, and acquires the attribute table from the contents server 1. The attribute table represents how the attribute (internal attribute) of the contents is changed inside the contents. Since the additional information is appended at the turning point of attribute in transmitting the contents, this table is needed.

An example of the attribute table of hoge.exe is shown in FIG. 6. Offset indicates the byte length from the beginning of the contents. From this table, it will be found that the degree of importance from byte $0^{th}$ to byte $2999^{th}$ is 6, the degree of importance from byte $3000^{th}$ to byte $10999^{th}$ is 1, and the degree of importance from byte $11000^{th}$ is changed to 3. To acquire the attribute table, the HTTP, or other communication protocols may be employed.

As shown in FIG. 1(a), the contents receiving apparatus 2 transmits a message 1 of a data request to the contents server 1 after acquiring the attribute table. As shown in FIG. 1(b), the message 1 includes a Range header, requesting bytes $0^{th}$ to $5999^{th}$ of hoge.exe to be transmitted. Also, the message 1 includes an X-Real-Range extension header having "0-5959" that is the data range information. This indicates that bytes $0^{th}$ to $5959^{th}$ of the contents data without additional information are requested. The length of additional information used in the contents distribution system of this embodiment 1 is 20 bytes.

The X-Real-Range extension header is one example of the request range information of the present invention, and the messages 1 and 2 are examples of the data request including the request range information of the present invention.

If the contents server 1 receives this message 1, it transmits the message 2. As shown in FIG. 1(c), the message 2 includes a Content-Range header, indicating bytes $0^{th}$ to $5999^{th}$ to be transmitted. The transmission range of contents data without additional information is from byte $0^{th}$ to byte $5959^{th}$. Further, two pieces of additional information are added to it, so that the contents data from byte $0^{th}$ to byte $5999^{th}$ is transmitted (see FIG. 1(f)). The contents receiving apparatus 2 makes a predetermined processing for the received message 2, extracts byte $0^{th}$ to byte $5959^{th}$ out of the contents data included in the received data, and processes the contents.

As shown in FIGS. 1(d) and 1(e) respecting, the messages 3 and 4 are likewise treated. However, a message 4 has only one additional information appended, because the attribute of contents is not changed in the middle of the HTTP message (see FIG. 1(g)). In the following, the transmission and reception of the above messages are repeated, until the last of contents is reached, or receiving of the contents is stopped by the user of the contents receiving apparatus 2.

The configuration and operation of the contents server 1 in the contents distribution system of this embodiment 1 will be described below.

FIG. 7 is a block diagram showing the configuration of the contents server 1 according to the embodiment 1. In FIG. 7, one or more contents are stored in the storage unit 101. Data request receiving unit 102 receives a data request from the contents receiving apparatus 2 via a network 3. The data request includes a contents identifier that is the information identifying the contents and the data range information that is the information indicating which range of the contents identified by the contents identifier is to be transmitted.

Contents data acquisition unit 103 extracts the contents data of the range to transmit from the storage unit 101 according to the data range information included in the data request received by the data request receiving unit 102 and passes it to transmission data organization unit 104.

The transmission data organization unit 104 organizes the transmission data by appending the additional information needed to transmit the contents data to the contents data of the passed range. What additional information is needed is confirmed by inquiring the attribute table holding transmitting unit 106. The attribute table holding transmitting unit 106 holds the attribute table for every contents.

And the transmitting unit 105 transmits the transmission data passed from the transmission data organization unit 104 via the network 3 to the contents receiving apparatus 2 in accordance with the HTTP.

Also, the attribute table holding transmitting unit 106 receives an attribute table request from the contents receiving apparatus 2 via the network 3 and transmits the corresponding attribute table via the transmitting unit 105 to the contents receiving apparatus 2.

Figure 8:
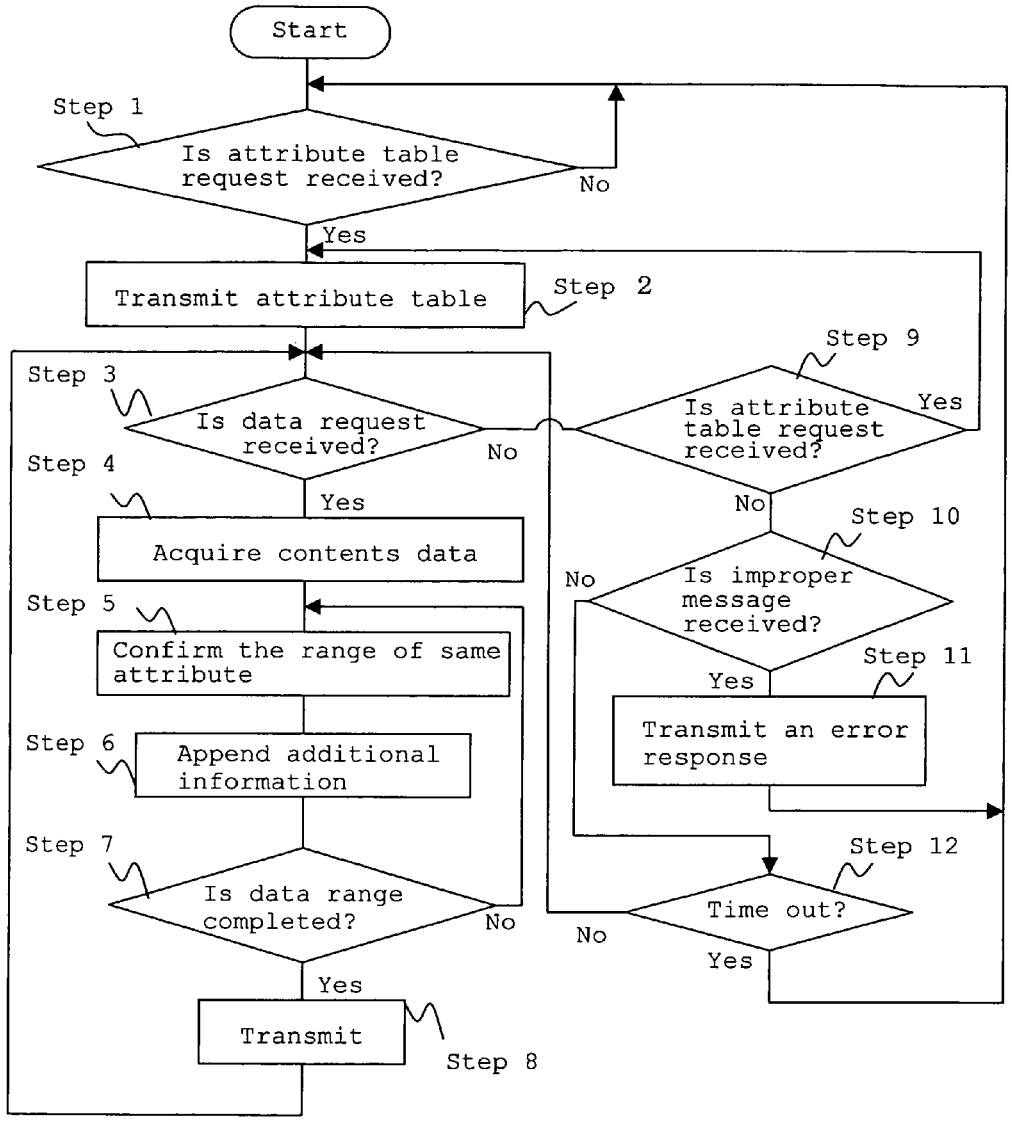
FIG. 8 is a flowchart showing the operation of the contents server according to the embodiment 1 of the present invention.

FIG. 8 is a flowchart showing the operation of the contents server 1 according to the embodiment 1. Referring to FIGS. 7 and 8, the operation of the contents server 1 in the sequence as explained in connection with FIG. 1(a) will be described below.

If the attribute table holding transmitting unit 106 receives an attribute table request including the contents identifier of the contents to be acquired from the contents receiving apparatus 2 (step 1), the attribute table corresponding to the contents is transmitted via the transmitting unit 105 to the contents receiving apparatus 2 (step 2).

If the data request receiving unit 102 receives an HTTP message (including a GET method; message 1 of FIG. 1(b), message 3 of FIG. 1(d)) that is a data request (step 3), this HTTP message is passed to the contents data acquisition unit 103.

The contents data acquisition unit 103 extracts a URI (/hoge.exe in the embodiment 1) of the contents identifier from the received HTTP message, and extracts the data range information from the X-Real-Range extension header. The contents data acquisition unit 103 acquires the contents data in a range indicated by the data range information from the contents stored in the storage unit 101 indicated by the contents identifier (step 4). The contents data acquisition unit 103 passes the acquired contents data to the transmission data organization unit 104, together with the extracted contents identifier and data range.

The transmission data organization unit 104 refers to the attribute table corresponding to the contents identifier included in the attribute table holding transmitting gun it 106. It is confirmed what the attribute in the requested data range is and the range where the attribute is the same from the start point of its data range is confirmed. For example, for the message 1 of FIG. 1(b), it is confirmed that the degree of importance is 6 and the attribute is the same from byte $0^{th}$ to byte $2999^{th}$ (step 5).

Then, the transmission data organization unit 104 appends the additional information to the top of contents data in the range where the attribute is the same (step 6). The additional information includes the information regarding the degree of importance. If the data to be transmitted does not reach the last of the requested data range (step 7), the procedure returns to step 5. Taking the message 1 of FIG. 1(b) as an example, it is confirmed that the degree of importance is 1 from byte $3000^{th}$ to byte $5959^{th}$ at the end of the data range, and the additional information is appended between byte $2999^{th}$ and byte $3000^{th}$ of the contents data.

If the last of data range is reached at step 7, the transmission data organization unit 104 transmits the transmission data in which the additional information is appended to the contents data to the transmitting unit 105, which then transmits this transmission data in accordance with the HTTP (step 8). At this time, the data range where the additional information is appended is written into the Content-Range header of the HTTP message. And after the transmission data is transmitted, the procedure returns to step 3.

If a new attribute table request is received from the contents receiving apparatus 2 (step 9) while the data request is not received at step 3, the procedure returns to step 2, where the corresponding attribute table is transmitted. If an improper message is received (step 10), an error response is transmitted (step 11), and then the procedure returns to step 1. If the time out takes place (step 12) because a predetermined time has elapsed while neither data request nor attribute table request are received, the procedure returns to step 1.

The configuration and operation of the contents receiving apparatus 2 in the contents distribution system of this embodiment 1 will be described below.

Figure 9:
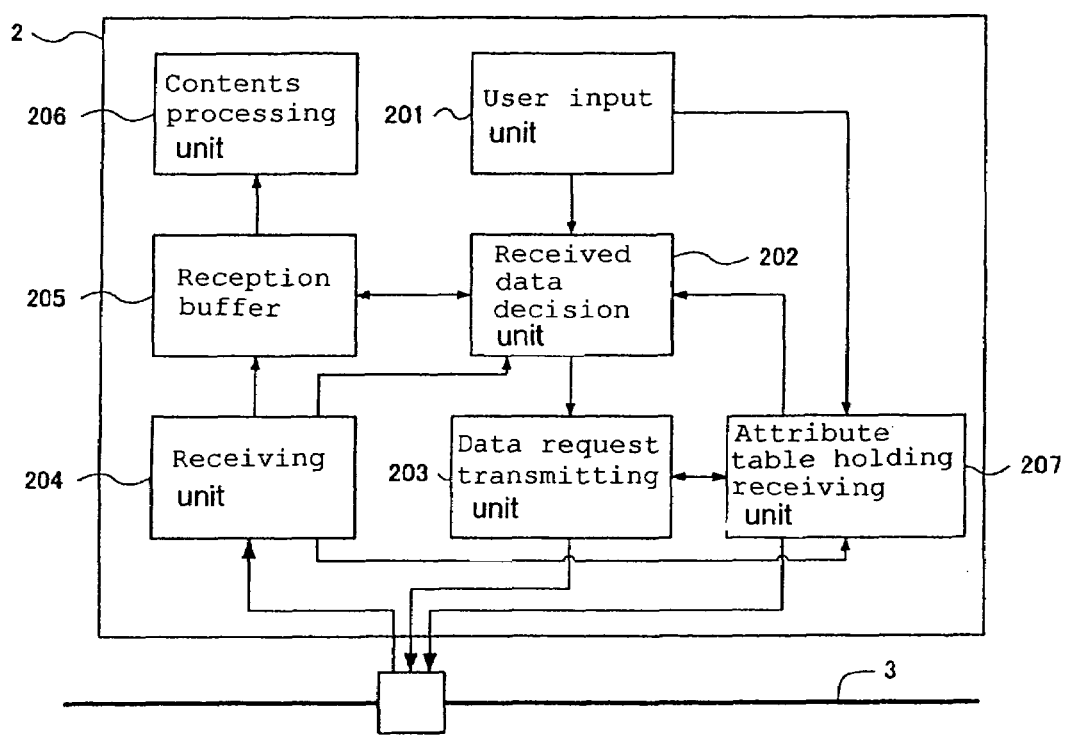
FIG. 9 is a block diagram showing the configuration of a contents receiving apparatus according to the embodiment 1 of the present invention.

FIG. 9 is a block diagram showing the configuration of the contents receiving apparatus 2 according to the embodiment 1.

User input unit 201 accepts the inputs from the user, including a contents identifier (name) that is the information for identifying the contents to be received from the contents server 1. Specifically, the user input unit 201 accepts the contents identifier and the range of data to be acquired (e.g., byte $10^{th}$ and beyond). The user input unit 201 may accept only the contents identifier. Input unit of the information accepted by the user input unit 201 may be a ten-key pad, a keyboard, a mouse or a remote controller for operating on the menu screen or the like. The user input unit 201 may be implemented by a device driver for the input unit such as ten-key pad or keyboard, or the control software for the menu screen.

Received data decision unit 202 decides the data range to be requested by receiving a notification from the user input unit 201, a result of inquiry as to the space capacity of a reception buffer 205, and a notification from the receiving unit 204 or the like. The data range information may be decided, based on the information accepted by the user input unit 201, the result of inquiry as to the space capacity of the reception buffer 205 and the notification from the receiving unit 204 or the like.

The data request transmitting unit 203 generates a data request including the contents identifier and data range information of the contents that are requested to receive, and transmits it via the network 3 to the contents server 1. At this time, the data request including the request range in which the additional information is appended to the data range information, as well as the data range information decided by the received data decision unit 202, is generated by referring to the attribute table holding receiving unit 207. In the message 1 of FIG. 1(*b*) or the message 3 of FIG. 1(*d*), the data range information is written into the X-Real-Range extension header, and the range including the additional information is written into the Range header.

The receiving unit 204 receives the contents data with the additional information appended from the network 3, passes the contents data to the reception buffer 205, and notifies the length of received contents data or the end point of received contents data to the received data decision unit 202. The receiving unit 204 analyzes the additional information before or after transmitting the contents data to the reception buffer 205, and performs an appropriate processing, if necessary. For example, if it is found that the contents data are encrypted from the additional information, a decoding process is performed.

Contents processing unit 206 sequentially reads the contents data from the reception buffer 205, and performs the necessary processing. For example, it is to display data on the screen or to make certain computation. The contents processing unit 206 may or may not comprises an output device such as a display or a speaker. The contents processing unit 206 may be implemented by the driver software of the output device and the processing software, or the driver software of the output device and application programs on the output device and the processing software or the MPU.

Attribute table holding receiving unit 207 transmits an attribute table request requesting the attribute table required for receiving the contents via the network 3 to the contents server 1. And as its response, the attribute table is received via the receiving unit 204 from the contents server 1 and held. Also, the attribute table is referred to from the data request transmitting unit 203.

Figure 10:
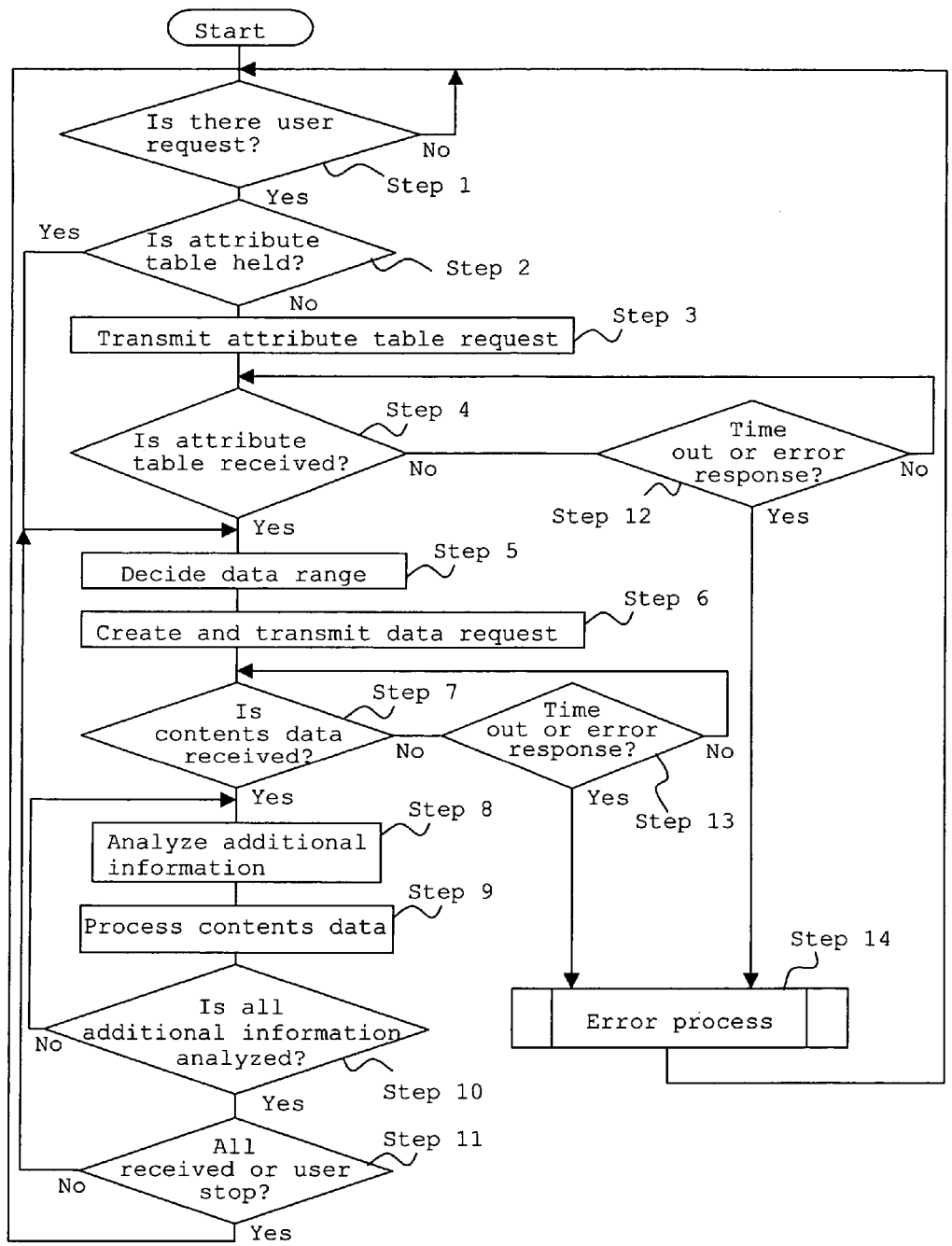
FIG. 10 is a flowchart showing the operation of a contents receiving apparatus according to the embodiment 1 of the present invention.

FIG. 10 is a flowchart showing the operation of the contents receiving apparatus 2 according to the embodiment 1. Referring to FIGS. 9 and 10, the operation of the contents receiving apparatus 2 in the sequence as explained in connection with FIG. 1(*a*) will be described below.

If the user input unit 201 receives a receive start request of the contents in the contents server 1 (step 1), it notifies the requested contents identifier (/hoge.exe in the embodiment 1) to the received data decision unit 202 and the attribute table holding receiving unit 207. At this time, when the range of contents to be received is inputted into the user input unit 201, its data range is also notified to the received data decision unit 202.

The attribute table holding receiving unit 207 judges whether or not the attribute table of the contents corresponding to the contents identifier notified from the user input unit 201 is held (step 2). If not, the attribute table request is transmitted via the network 3 to the contents server 1 (step 3).

And if the receiving unit 204 receives the attribute table (step 4), the received attribute table is passed to the attribute table holding receiving unit 207. The attribute table holding receiving unit 207, to which the attribute table is passed, saves the attribute table associated with the corresponding contents identifier, and notifies the received data decision unit 202.

The received data decision unit 202 decides the request data range to be transmitted to the contents server 1 from the range of data to be received that the user inputs into the user input unit 201 and the space capacity of the reception buffer 205 (step 5). And together with the contents identifier the data range information indicating the decided data range are notified to the data request transmitting unit 203.

The data request transmitting unit 203 generates a data request (message 1 of FIG. 1(*b*), message 3 of FIG 1(*d*)) including the request range which considers the additional information obtained with the received contents data by referring to the contents identifier and data range information notified from the received data decision unit 202 and the attribute table holding receiving unit 207, and transmits it to the contents server 1 (step 6).

If the receiving unit 204 receives the contents data (message 2 as shown in FIGS. 1(*c*) and 1(*f*), message 4 as shown in FIGS. 1(*e*) and 1(*g*)) with the additional information corresponding to the transmitted data request appended (step 7), the additional information is analyzed (step 8). If the additional information consists of only the information regarding the degree of importance, the contents receiving apparatus 2 does not need to perform the processing for the additional information, whereby the receiving unit 204 removes the additional information and stores the contents data in the reception buffer 205. This contents data is sequentially read into the contents processing unit 206 and processed (step 9).

If the receiving unit 204 does not finish to analyze all the additional information (i.e., there is any contents data read into the contents processing unit 206) (step 10), the processing following step 8 is repeated.

If all the contents corresponding to the contents identifier inputted into the user input unit 201 (and its data range if inputted) are received, or the user instructs the user input unit 201 to stop (step 11), the procedure returns to the beginning (step 1).

If the attribute table corresponding to the contents is already held in the attribute table holding receiving unit 207 due to the previous communication or the like at step 2, the attribute table is not replaced, and the procedure goes to step 5. In this case, however, the attribute table may be replaced.

At step 4 or step 7, if the time out takes place while any data is not received, or an error response is received from the contents server 1 (steps 12, 13), an error process is performed (step 14), and the procedure returns to the beginning (step 1).

In the contents distribution system of the embodiment 1, the contents server 1 can specify the range of contents except for the additional information to be actually transmitted. Since the contents receiving apparatus 2 can designate the range of contents data except for the additional information to be actually transmitted, without regard to a way of dividing the contents data, the contents server 1 knows the range of contents to be transmitted, even without knowing the way of dividing and receiving the content data supposed for the contents receiving apparatus 2.

The contents receiving apparatus 2 can designate correctly the receive start position of contents data to the contents server 1, even when it desires to receive the data from halfway of the contents. Therefore, the contents receiving apparatus 2 can receive the data from halfway of the contents.

In the contents distribution system of the embodiment 1, the effects of the contents server 1 can be achieved in accordance with the HTTP that is the standard protocol.

The contents of the execution file hoge.exe as cited in the embodiment 1 is illustrative. It goes without saying that that other contents, for example, AV contents including the video, the image and/or the audio or other formats, may be also employed.

Also, in the embodiment 1, a repeater, for example, may be interposed between the contents server 1 and the contents receiving apparatus 2, in which a data request is transmitted from the contents receiving apparatus 2 to the repeater, and the repeater gains access to the contents server 1, acquires the contents, and transmit the contents to the contents receiving apparatus 2. That is, it is not necessary that the contents server 1 and the contents receiving apparatus 2 transmits or receives the data directly via the network.

Though in the contents distribution system of the embodiment 1, the contents receiving apparatus 2 receives in advance the attribute table via the network 3 from the contents server 1 before receiving the contents data, the contents receiving apparatus 2 may acquire and hold the attribute table in another way. For example, the attribute table may be acquired via the network from a server different from the contents server 1, or the attribute table stored in the storage media or the like may be read beforehand and held without the network.

Embodiment 2

Figure 11:
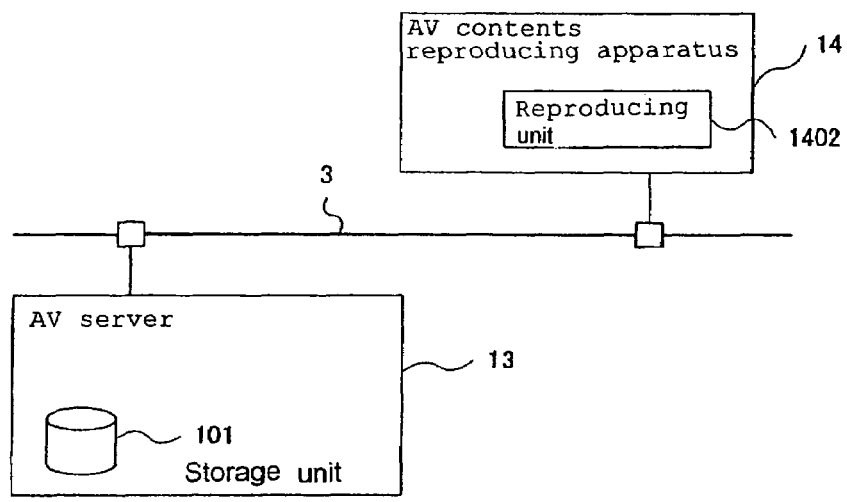
FIG. 11 is a diagram showing the configuration of a network for a contents distribution system according to an embodiment 2 of the present invention.

FIG. 11 is a diagram showing the configuration of a contents distribution system according to an embodiment 2 of the present invention. In the embodiment 2, the same or like parts are designated by the same numerals as in the embodiment 1, and not described here.

First of all, a protocol control method of designating a reproduction data range from an AV contents reproducing apparatus 14 to an AV server 13 in the contents distribution system of the embodiment 2 will be described below.

The AV server 13 transmits the AV contents including the video, the image and/or the audio stored in storage unit 101 to the network 3, upon a reproduction request from the AV contents reproducing apparatus 14. The AV contents reproducing apparatus 14 receives the AV contents from the AV server 13, and performs the reproduction in reproducing unit 1402. Examples of the AV contents include the MPEG video, AC3 audio and JPEG image or the like. The AV server 13 and the AV contents reproducing apparatus 14 are examples of the contents server and the contents reproducing apparatus of the present invention, respectively.

FIG. 12(*a*) is a sequence chart describing the transmission and reception between the AV server 13 and the AV contents reproducing apparatus 14. In this embodiment 2, an HTTP is employed for transmission and reception. FIGS. 12(*b*) to 12(*e*) show the substance of HTTP message, and FIGS. 12(*f*) and 12(*g*) show the format of HTTP message. The transmission and reception protocol does not matter in this embodiment 2. FIGS. 12(*a*) to 12(*g*) are examples in which the AV contents reproducing apparatus 14 reproduces the AV contents hogehoge.mpg stored in the storage unit 101 of the AV server 13 from the beginning of the AV contents via the network. Herein, hogehoge.mpg is an MPEG video file.

Figures 15, 16:
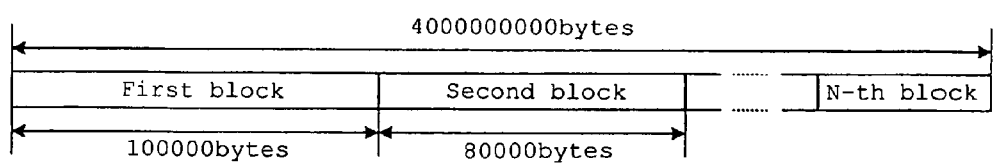
FIG. 15 is a diagram showing the format of the AV contents as explained in the embodiment 2 of the present invention.
FIG. 16 is a diagram showing an attribute table of the AV contents as explained in the embodiment 2 of the present invention.

The format of hogehoge.mpg is shown in FIG. 15. The total size of hogehoge.mpg is 4000000000 bytes, and hogehoge.mpg is composed of several blocks with different attribute concerning copyright protection. The first block is 100000 bytes, and the second block is 80000 bytes. The division of blocks by the copyright protection attribute is only illustrative. The division of blocks may be made according to other attribute, or no division of blocks (all the contents are one block) may be made for the AV contents. Also, the total size or block size does not matter. The storage unit 101 as shown in FIG. 11 is suitably a non-volatile storage media such as a hard disk, but may be a volatile storage media.

In FIG. 12(*a*), the AV contents reproducing apparatus 14 firstly requests an attribute table concerning to the AV contents to be acquired, and acquires the attribute table from the AV server 13. The attribute table represents how the copyright protection attribute (internal attribute) of the AV contents is changed inside the AV contents. Since the additional information is appended at the turning point of copyright protection attribute in transmitting the AV contents, this table is needed.

An example of the attribute table of hogehoge.mpg is shown in FIG. 16. Offset indicates the byte length from the beginning of the AV contents. From this table, it will be found that the attribute is changed such that the copyright protection is required from byte $0^{th}$ to byte $99999^{th}$, the copyright is free and encryption on the network 3 is unnecessary from byte $100000^{th}$ to byte $179999^{th}$, and the copyright is free and encryption on the network 3 is necessary from byte $180000^{th}$. To acquire the attribute table, the HTTP, or other communication protocols may be employed.

As shown in FIG. 12(*a*), the AV contents reproducing apparatus 14 transmits a message 1 that is a reproduction start request to the AV server 13 after acquiring the attribute table. As shown in FIG. 12(*b*), the message 1 includes a Range header, requesting bytes $0^{th}$ to $80009^{th}$ of hogehoge.mpg to be transmitted. Also, the message 1 includes an X-Real-Range extension header having "0-79999" of the reproduction range information. This indicates that bytes $0^{th}$ to $79999^{th}$ of the AV contents data without additional information are requested. The length of additional information used in the AV contents transmitting and receiving system of this embodiment 2 is 10 bytes.

The X-Real-Range extension header is one example of the request range information of the present invention, and the messages 1 and 2 are examples of the data request including the request range information of the present invention.

If the AV server 13 receives this message 1, it transmits the message 2. As shown in FIG. 12(*c*), the message 2 includes a Content-Range header, indicating bytes $0^{th}$ to $80009^{th}$ to be transmitted. The transmission range of AV contents data without additional information is from byte $0^{th}$ to byte $7999^{th}$. Further, one additional information is added to it, so that the contents data from byte $0^{th}$ to byte $80009^{th}$ is transmitted (see FIG. 12(f)). The AV contents reproducing apparatus 14 makes a predetermined processing for the received message 2, extracts byte $0^{th}$ to byte $79999^{th}$ of the AV contents data out of the received data, and processes the AV contents.

Figures 12A, 12B, 12C:
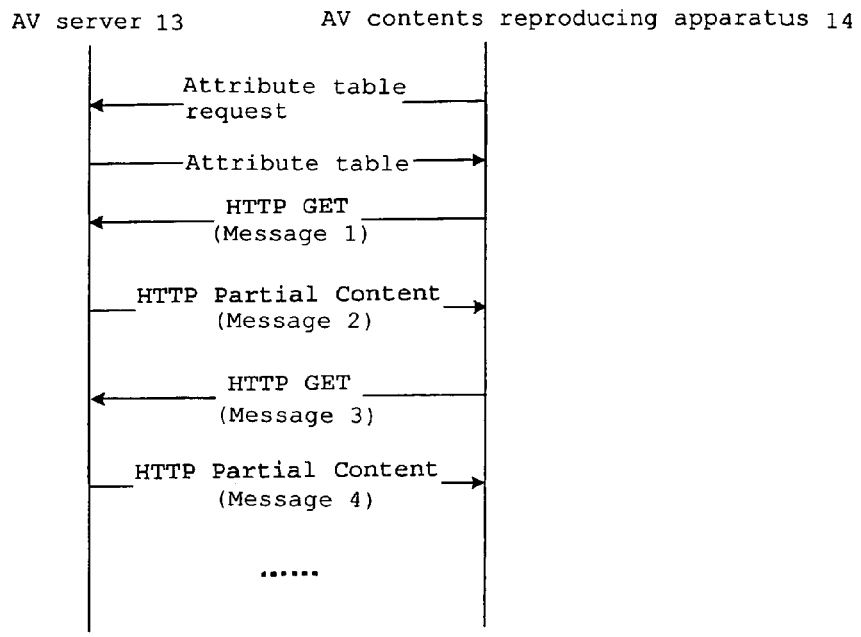
FIG. 12(*a*) is a sequence chart describing a procedure for transmitting and receiving the contents between AV server and AV contents reproducing apparatus in a contents transmitting and receiving system according to an embodiment 2 of the present invention.

As shown in FIGS. 12(d) and 12(e), the messages 3 and 4 are likewise treated. However, a message 4 has two pieces additional information appended, because the attribute of AV contents is changed in the middle of the HTTP message (see FIG. 12(g)). As shown in FIGS. 12(c) and 12(e) respectively, its matters are reflected to the Range header of the message 3 and the Content-Range header of the message 4. In the following, the transmission and reception of the messages are repeated, until the last of AV contents is reached, or reproduction is stopped by the user of the AV contents reproducing apparatus 14.

The configuration and operation of the AV server 13 in the contents distribution system of this embodiment 2 will be described below.

Figure 13:
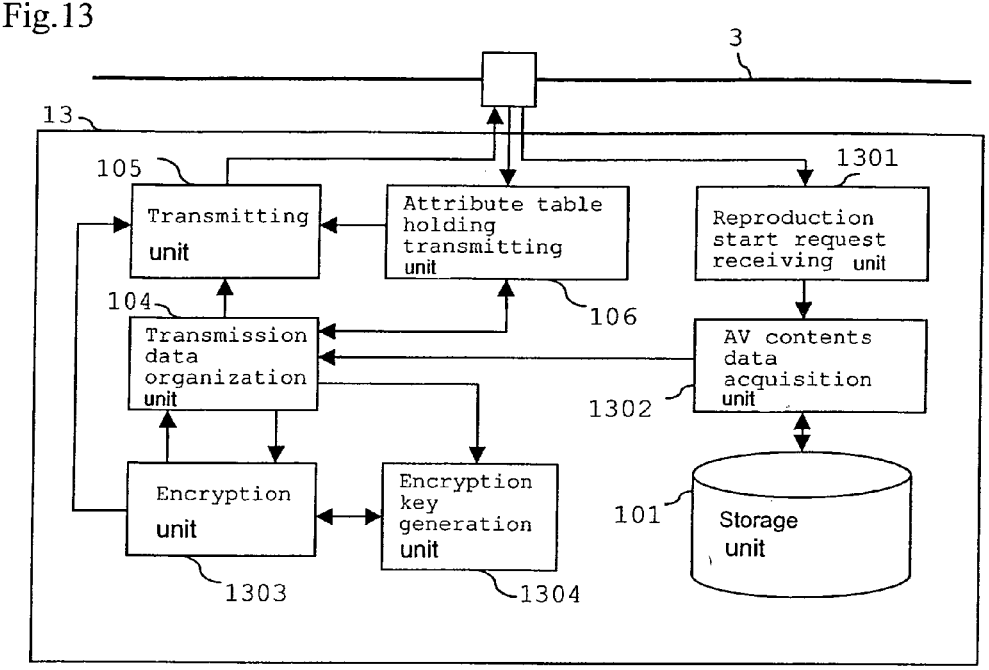
FIG. 13 is a block diagram showing the configuration of an AV server according to the embodiment 2 of the present invention.

FIG. 13 is a block diagram showing the configuration of the AV server 13 according to the embodiment 2. In FIG. 13, one or more AV contents including the image or the audio, or both, are stored in the storage unit 101. Reproduction start request receiving unit 1301 receives a reproduction start request from the AV contents reproducing apparatus 14 via the network 3. The reproduction start request includes an AV contents identifier that is the information identifying the AV contents and the reproduction range information that is the information indicating which range of the AV contents identified by the AV contents identifier is to be transmitted.

AV contents data acquisition unit 1302 extracts the AV contents data of the range to transmit from the storage unit 101 according to the data range information included in the reproduction start request received by the reproduction start request receiving unit 1301 from the storage unit 101 and passes it to transmission data organization unit 104.

The encryption unit 1303 encrypts the AV contents data inputted from the transmission data organization unit 104 and passes it to the transmitting unit 105.

An encryption key is generated by encryption key generation unit 1304. A method of notifying the information in accordance with a prescribed procedure is decided between the AV server 13 and the AV contents reproducing apparatus 14, in which the decoding information according to the method is added to the additional information generated by the transmission data organization unit 104. The key itself is passed to encryption unit 1303, and employed to encrypt the AV contents data. In the embodiment 2, the key is changed every time the copyright attribute of the AV contents is changed. The encryption key and the decoding key may or may not be the same (common key).

Though the transmission data organization unit 104, the transmitting unit 105 and the attribute table holding transmitting unit 106 have the same functions as explained in the embodiment 1, the contents to be treated are the AV contents in the embodiment 2. Also, in the embodiment 2, the items of additional information are the state of copyright protection and the information for decoding.

Figure 17:
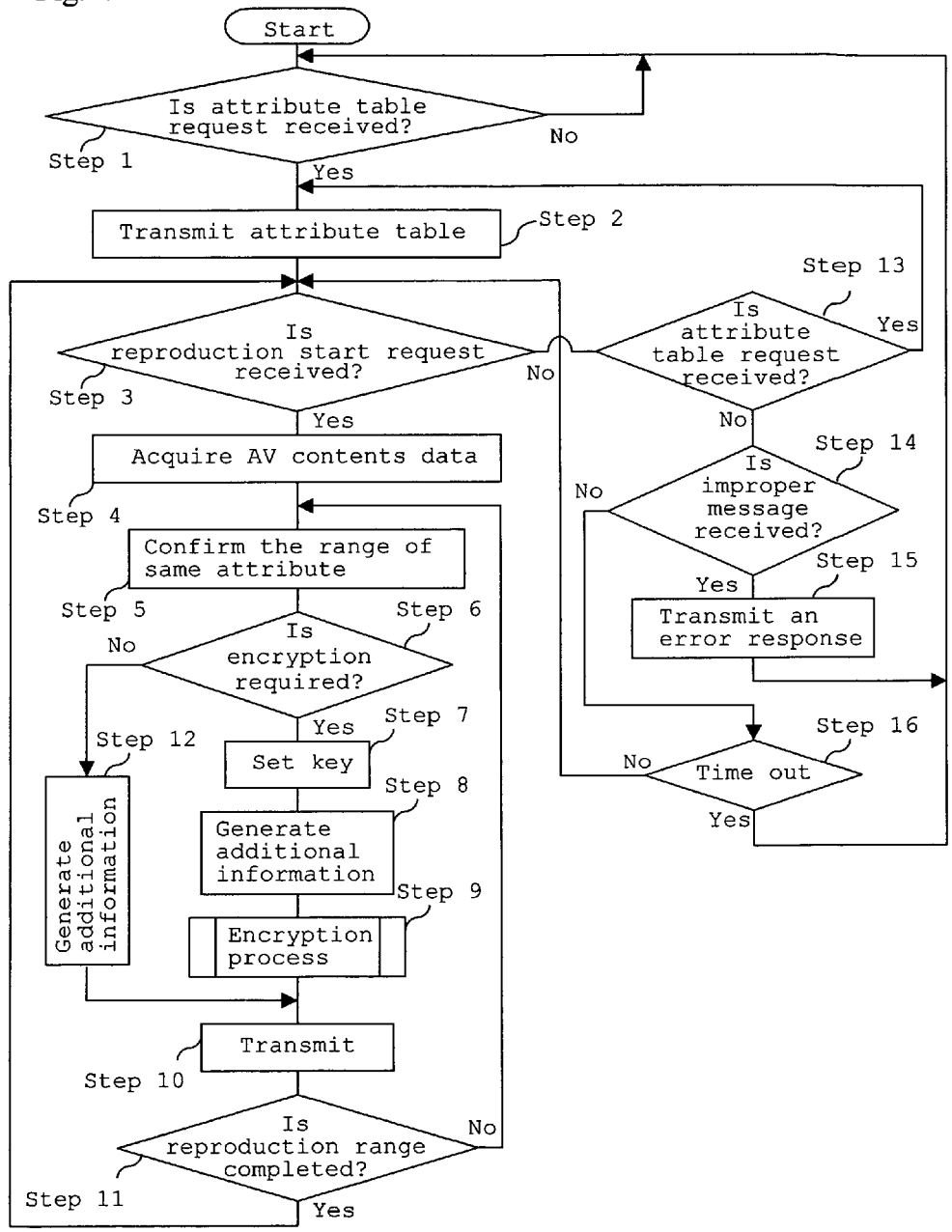
FIG. 17 is a flowchart showing the operation of the AV server according to the embodiment 2 of the present invention.

FIG. 17 is a flowchart showing the operation of the AV server 13 according to the embodiment 2. Referring to FIGS. 13 and 17, the operation of the AV server 13 in the sequence as explained in connection with FIG. 12 will be described below.

If the attribute table holding transmitting unit 106 receives an attribute table request including the AV contents identifier of the AV contents to be acquired from the AV contents reproducing apparatus 14 (step 1), an attribute table corresponding to the AV contents is transmitted via the transmitting unit 105 to the AV contents reproducing apparatus 14 (step 2).

If the reproduction start request receiving unit 1301 receives an HTTP message (including a GET method; message 1 of FIG. 12(b), message 3 of FIG. 12(d)) that is a reproduction start request (step 3), this HTTP message is passed to the AV contents data acquisition unit 1302.

The AV contents data acquisition unit 1302 extracts a URI (/hogehoge.mpg in the embodiment 2) of AV contents identifier from the received HTTP message, and extracts the reproduction range information from the X-Real-Range extension header. The AV contents data acquisition unit 1302 acquires the AV contents data in a range indicated by the reproduction range information from the AV contents stored in the storage unit 101 indicated by the AV contents identifier (step 4). The AV contents data acquisition unit 1302 passes the acquired AV contents data to the transmission data organization unit 104, together with the extracted AV contents identifier and reproduction range.

The transmission data organization unit 104 refers to the attribute table corresponding to the AV contents identifier included in the attribute table holding transmitting unit 106. It is confirmed what the attribute in the requested reproduction range is and the range where the attribute is the same from the start point of its reproduction range is confirmed (step 5). For example, for the message 1 of FIG. 12(b), it is confirmed that there is the same attribute that the copyright protection is required over the entire reproduction range. For the message 3 of FIG. 12(b), there is the same attribute that the copyright protection is required in the reproduction range from byte $80000^{th}$ to byte $99999^{th}$.

Then, the transmission data organization unit 104 determines whether or not the encryption is required in transmitting the AV contents data from the copyright attribute of the AV contents data to be transmitted (step 6), and instructs the encryption key generation unit 1304 to generate the key and set it to the encryption unit 1303, if necessary. The encryption key generation unit 1304 generates the key and sets it to the encryption unit 1303 (step 7), and notifies the information for decoding to the transmission data organization unit 104.

The transmission data organization unit 104 generates the additional information including the state of copyright protection (copyright protection required in this case) from the attribute table and the information for decoding from the encryption key generation unit 1304 by referring to the attribute table holding transmitting unit 106 (step 8). Also, the transmission data organization unit 104 passes the AV contents data required to be encrypted to the encryption unit 1303, and the encryption unit 1303 performs an encryption process (step 9).

Thereafter, the transmission data organization unit 104 firstly forwards the additional information to the transmitting unit 105, and then instructs the encryption unit 1303 to pass the encrypted AV contents data to the transmitting unit 105.

The transmitting unit 105 transmits firstly the HTTP header and then the additional information in accordance with the HTTP. Thereafter, it transmits the encrypted AV contents data (step 10).

At step 6, if the transmission data organization unit 104 judges that the AV contents data to be transmitted is not required to be encrypted by referring to the attribute table holding transmitting unit 106, the additional information including the state of copyright protection (copyright free and encryption unnecessary in this case) is generated (step 12).

Thereafter, the additional information and the AV contents data are passed to the transmitting unit 105, and then the transmitting unit 105 transmits the AV contents data with the additional information appended in accordance with the HTTP (step 10).

The transmission data organization unit 104 determines whether or not the last of requested reproduction range is reached (step 11). If not, the processing following step 5 is performed for the AV contents data in the range where data is not transmitted.

If the last of reproduction range is reached at step 11, the procedure returns to step 3 to wait for the next reproduction start request.

If a new attribute table request is received from the AV contents reproducing apparatus 14 (step 13) while the reproduction start request is not received at step 3, the procedure returns to step 2, where the corresponding attribute table is transmitted. If an improper message is received (step 14), an error response is transmitted (step 15), and then the procedure returns to step 1. If the time out takes place (step 16) because a predetermined time has elapsed while neither reproduction start request nor attribute table request are received, the procedure returns to step 1.

The configuration and operation of the AV contents reproducing apparatus 14 in the contents distribution system of this embodiment 2 will be described below.

Figure 14:
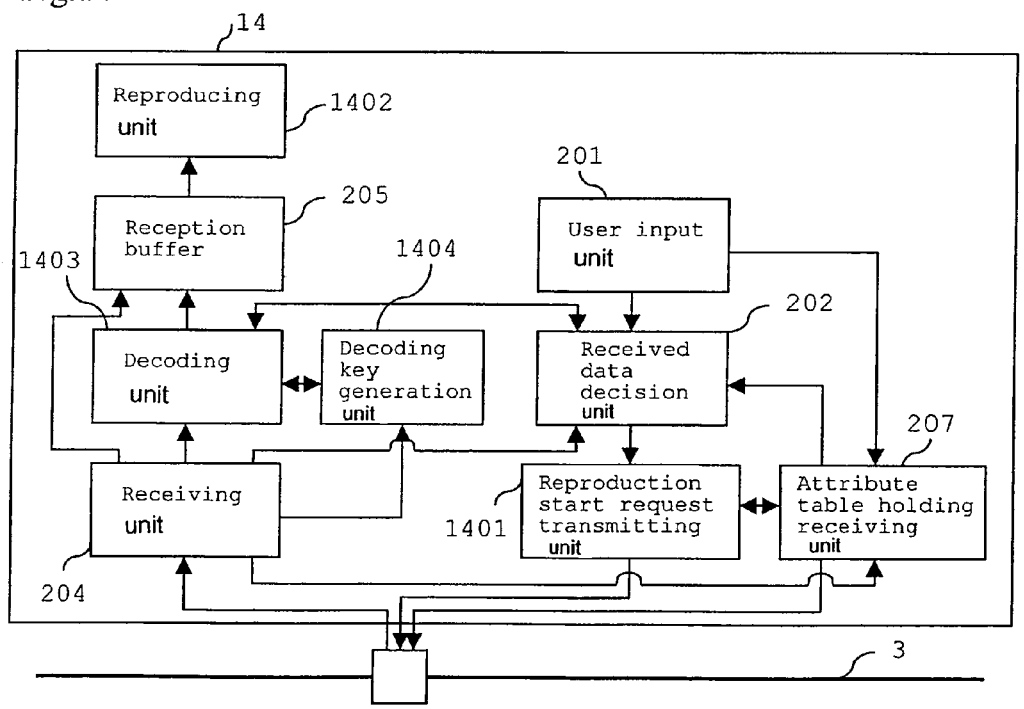
FIG. 14 is a block diagram showing the configuration of an AV contents reproducing apparatus according to the embodiment 2 of the present invention.

FIG. 14 is a block diagram showing the configuration of the AV contents reproducing apparatus 14 according to the embodiment 2.

The user input unit 201 accepts the inputs from the user, including an AV contents identifier (name) that is the information for identifying the AV contents to be reproduced. Specifically, the user input unit 201 accepts the AV contents identifier and the time information for reproduction (e.g., "30 minutes later"). The user input unit 201 may accept only the AV contents identifier. The input unit of the information accepted by the user input unit 201 maybe a ten-keypad, a keyboard, a mouse or a remote controller for operating on the menu screen. The user input unit 201 may be implemented by a device driver for the input unit such as ten-key pad or keyboard, or the control software or the like for the menu screen.

The received data decision unit 202 decides the reproduction range to be requested by receiving a notification from the user input unit 201, a result of inquiry as to the space capacity of the reception buffer 205, and a notification or the like from the receiving unit 204. The reproduction range information may be decided, based on the information accepted by the user input unit 201, the result of inquiry as to the space capacity of the reception buffer 205 and the notification or the like from the receiving unit 204. When the reproduction range information is represented in byte position, and the time information for reproduction is inputted by the user, a conversion expression or a conversion table between the time information inputted by the user and the byte position on the AV contents is prepared.

Reproduction start request transmitting unit 1401 generates a reproduction start request including the AV contents identifier and reproduction range information of the AV contents requested to reproduce, and transmits it via the network 3 to the AV server. At this time, a reproduction start request including the request range which is considered into the additional information and the reproduction range information, in addition to the reproduction range information decided by the received data decision unit 202, is generated by referring to the attribute table holding receiving unit 207. In the message 1 of FIG. 12(*b*) or the message 3 of FIG. 12(*d*), the reproduction range information is written into the X-Real-Range extension header, and the range including the additional information is written into the Range header.

The receiving unit 204 receives the AV contents data with the additional information appended from the network 3, passes the AV contents data to the reception buffer 205, and notifies the length of received AV contents data or the termination point of received AV contents data to the received data decision unit 202. Also, the receiving unit 204 judges whether or not the AV contents data is encrypted from the additional information, and if so, notifies the information for decoding to the decoding key generation unit 1404.

The reproducing unit 1402 sequentially reads and reproduces the AV contents data from the reception buffer 205. The reproducing unit 1402 may or may not comprise an output device such as a display or a speaker. The reproducing unit 1402 may be implemented by the driver software of the output device and the reproduction processing software, or the output device, the driver software of the output device and the reproduction processing software.

The attribute table holding receiving unit 207 transmits an attribute table request requesting the attribute table required for receiving and reproducing the AV contents via the network 3 to the AV server 13. And as its response, the attribute table is received via the receiving unit 204 from the AV server 13 and held. Also, the attribute table is referred to from the reproduction start request transmitting unit 1401.

Decoding unit 1403 receives the encrypted AV contents data from the receiving unit 204, and decodes and stores it in the reception buffer 205. A decoding key is generated by the decoding key generation unit 1404, based on the information for decoding passed from the receiving unit 204, and set to the decoding unit 1403.

The decoding key generating unit 1404 generates a key in a predetermined way from the information for decoding notified from the receiving unit 204, and sets it to the decoding unit 1403. A method of generating the key is provided as follows. A key for encrypting/decoding the key (key encryption key) is shared between the AV server 13 and the AV contents reproducing apparatus 14, and the additional information includes the decoding key encrypted by the key encryption key as the information for decoding. The decoding key generation unit 1404 calculates the decoding key using the shared key encryption key.

Figure 18:
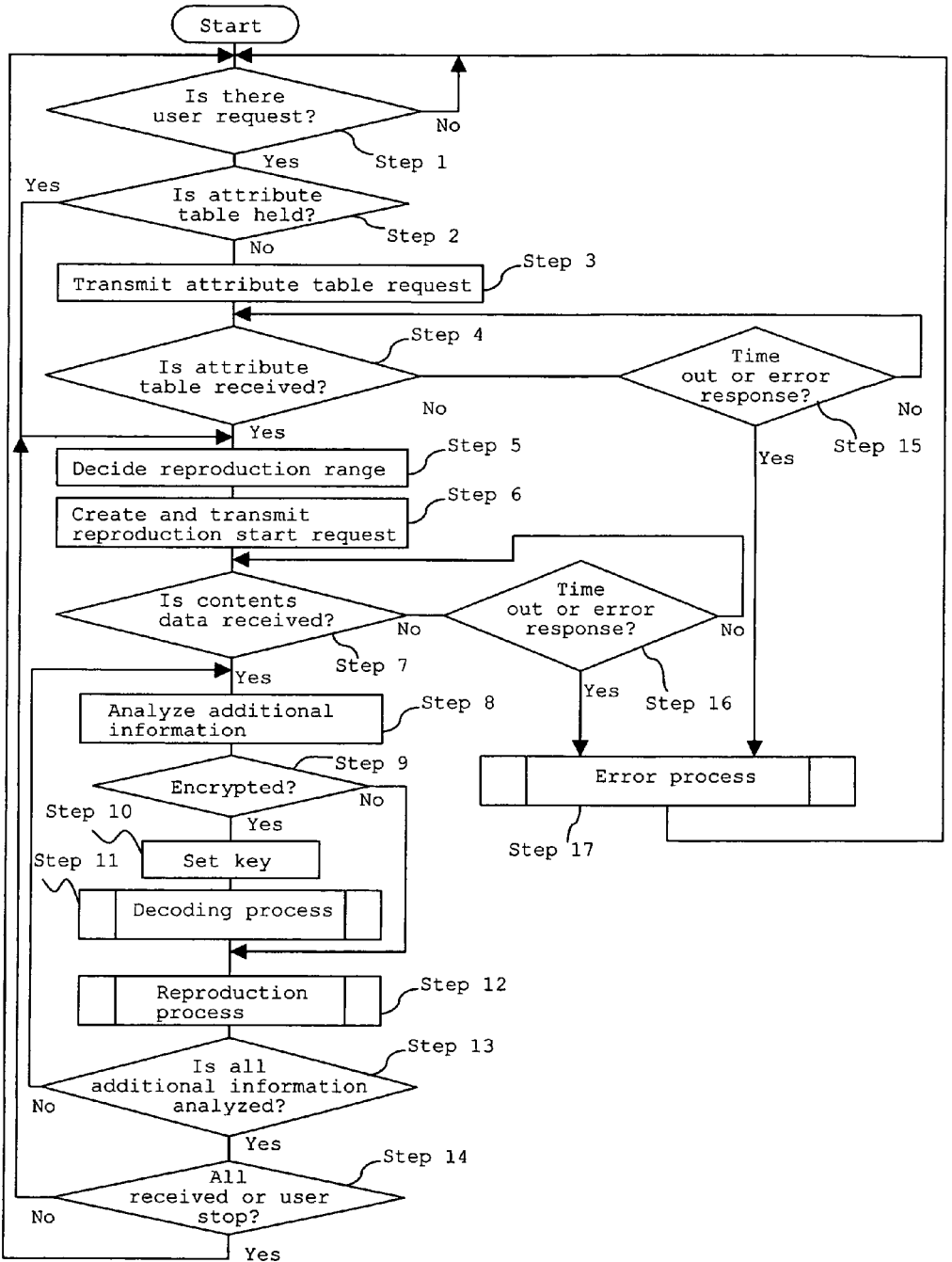
FIG. 18 is a flowchart showing the operation of the AV contents reproducing apparatus according to the embodiment 2 of the present invention.

FIG. 18 is a flowchart showing the operation of the AV contents reproducing apparatus 14 according to the embodiment 2. Referring to FIGS. 14 and 18, the operation of the AV contents reproducing apparatus 14 in the sequence as explained in connection with FIG. 12(*a*) will be described below.

If the user input unit 201 receives a reproduction start request of the AV contents in the AV server 13 (step 1), it notifies the requested AV contents identifier (/hogehoge.mpg in the embodiment 2) to the received data decision unit 202 and the attribute table holding receiving unit 207. At this time, when the range of AV contents to be reproduced is inputted into the user input unit 201, its reproduction range is also notified to the received data decision unit 202.

The attribute table holding receiving unit 207 judges whether or not the attribute table of the AV contents corresponding to the AV contents identifier notified from the user input unit 201 is held (step 2). If not, the attribute table request is transmitted via the network 3 to the AV server 13 (step 3).

And if the receiving unit 204 receives the attribute table (step 4), the received attribute table is passed to the attribute table holding receiving unit 207. The attribute table holding receiving unit 207, to which the attribute table is passed, saves the attribute table associated with the corresponding AV contents identifier, and notifies the received data decision unit 202.

The received data decision unit 202 decides the reproduction range to be requested for transmission to the AV server 13 from the range of AV contents to be reproduced that the user inputs into the user input unit 201 and the space capacity of the reception buffer 205 (step 5). And together with the AV contents identifier the reproduction range information indicating the decided reproduction range are notified to the reproduction start request transmitting unit 1401.

The reproduction start request transmitting unit 1401 generates a reproduction start request (message 1 of FIG. 12(*b*), message 3 of FIG. 12(*d*)) including the request range which contains the additional information obtained with the received AV contents data by referring to the AV contents identifier and reproduction range information notified from the received data decision unit 202 and the attribute table holding receiving unit 207, and transmits it to the AV server 13 (step 6).

If the receiving unit 204 receives the AV contents data (message 2 as shown in FIGS. 12(*c*) and 12(*f*), message 4 as shown in FIGS. 12(*e*) and 12(*g*)) with the additional information corresponding to the transmitted reproduction start request appended (step 7), the additional information is analyzed (step 8), and a judgment is made whether or not the AV contents data is encrypted by checking the state of copyright protection (step 9). If so, the receiving unit 204 notifies the information for decoding included in the additional information to the decoding key generation unit 1404.

The decoding key generation unit 1404 generates the key from the notified information for decoding, and sets it to the decoding unit 1403 (step 10). Thereafter, the decoding key generation unit 1404 notifies the receiving unit 204 that the key setting is completed.

If the completion of key setting is notified from the decoding key generation unit 1404, the receiving unit 204 passes the received AV contents data to the decoding unit 1403. At this time, if the AV contents data received at step 7 has plural pieces of additional information appended, the receiving unit 204 passes the AV contents data directly before the next additional information to the decoding unit 1403.

The decoding unit 1403 decodes the AV contents data passed from the receiving unit 204 employing the key set by the decoding key generation unit 1404 (step 11), and stores it in the reception buffer 205. The reproducing unit 1402 sequentially takes out the decoded AV contents data stored in the reception buffer 205, and reproduces the AV contents data on the output device or the like (step 12).

If it is judged that data is not encrypted at step 9, the receiving unit 204 stores the received AV contents data directly in the reception buffer 205, whereby the AV contents data is reproduced by the reproducing unit 1402 (step 12). In this case, if the AV contents data received at step 7 has plural pieces of additional information appended, the receiving unit 204 passes the AV contents data directly before the next additional information to the decoding unit 1403.

If the receiving unit 204 does not finish analyzing all the additional information (i.e., there is any AV contents data not read into the reproducing unit 1402) (step 13), the processing following step 8 is repeated.

If all the AV contents (and its reproduction range, if inputted) corresponding to the AV contents identifier inputted into the user input unit 201 are received, or if the user instructs the user input unit 201 to stop (step 9), the procedure returns to the beginning (step 1). If not, the processing following step 5 is repeated.

At step 2, if the attribute table corresponding to the AV contents is already held in the attribute table holding receiving unit 207 due to the previous communication, the attribute table is not replaced, and the procedure goes to step 5. In this case, however, the attribute table may be replaced.

At step 4 or step 7, if the time out takes place while any data is not received, or an error response is received from the AV server 13 (steps 15, 16), an error process is performed (step 17), and the procedure returns to the beginning (step 1).

In the contents distribution system of the embodiment 2, in addition to the effects of the contents distribution system of the embodiment 1, the AV server 13 can designate the range of AV contents data except for the additional information to be actually transmitted, even if the additional information includes the state of copyright protection.

Also, in the contents distribution system of the embodiment 2, the AV server 13 can designate the range of AV contents data to be actually transmitted except for the additional information, even if the additional information includes the information for decoding.

The AV contents of hogehoge.mpg as employed in the embodiment 2 is illustrative, and other AV contents, for example, JPEG image, AC3 audio or other formats, may be also employed. Also, the AV contents, as well as other contents data than the AV contents, may be employed.

Also, in the embodiment 2, a repeater, for example, may be interposed between the AV server 13 and the AV contents reproducing apparatus 14, in which a reproduction start request is transmitted from the AV contents reproducing apparatus 14 to the repeater, and the repeater gains access to the AV server 13, acquires the AV contents, and transmit the AV contents to the AV contents reproducing apparatus 14. That is, it is not required that the AV server 13 and the AV contents reproducing apparatus 14 make the transmission or reception of data directly via the network.

Though in the contents distribution system of the embodiment 2, the AV contents reproducing apparatus 14 receives in advance the attribute table via the network 3 from the AV server 13, before receiving the AV contents data, the AV contents reproducing apparatus 14 may acquire and hold the attribute table in another way. For example, the attribute table may be acquired via the network from a server different from the AV server 13, or the attribute table stored in the storage media or the like may be read beforehand and held without the network.

An example of the additional information in the case of reproducing the AV contents via the network in this embodiment is a PCP header for DTCP-IP (refer to DTCP Volume 1 Supplement E Mapping DTCP to IP (Informational Version) Revision 1.0 Nov. 24, 2003). The PCP header is appended every time the copyright protection information of AV contents is changed, and always appended between the HTTP header and AV contents data of its message body.

In the case where the AV contents are the video in the DVD-VR format, the copyright protection information is included (as a part of the AV contents data) at the top of each VOBU composing the AV contents. When the AV server transmits the AV contents employing the DTCP-IP, the AV server appends the PCP header of additional information to the AV contents by referring to this copyright information at the top of each VOBU and transmits the AV contents data onto the network.

In such case, the request range from the AV contents reproducing apparatus may be restricted to start from the top of each VOBU. When there is not such restriction, the PCP header is appended after confirming what copyright protection information the request range has by going back to the top of VOBU. As a result, the processing load of the AV server is increased.

In the first and second embodiments of the present invention, the HTTP request message includes the Range header, in addition to the X-Real-Range extension header, but may include only the X-Real-Range extension header. Employing another header instead of the Content-Range header included in the HTTP response message, the data range of AV contents except for the additional information to be transmitted may be designated. Since in practice the contents receiving apparatus (AV contents reproducing apparatus) only knows how the contents are divided, the contents server (AV server) simply employs the value of received Range header as the value of the Content-Range header and such an operation is meaningless. However, since the HTTP only supports the block transfer method that employs the Range header and the Content-Range header, if this change is made, the operation does not precisely comply with the HTTP, and another definition is needed.

A program of the present invention enables a computer to perform the functions of a part or all of the unit or devices in the contents distribution system of the present invention and is operable in cooperation with the computer.

Also, a storage media of the present invention stores the program for enabling the computer to perform a part or all of the functions of a part or all of the unit or devices in the contents distribution system of the present invention, and is readable by the computer, the read program being operable in cooperation with the computer.

The "part of the unit or devices" of the present invention means one or more unit or devices among a plurality of unit or devices.

The "functions of the unit or devices" of the present invention means all or part of the functions of the unit or devices.

In one use form of the program of the present invention, the program may be stored on the storage media readable by the computer and operable in cooperation with the computer.

The storage media may be a ROM or the like, and the transmission media maybe the Internet, light, radio wave and audio wave.

Also, the computer of the present invention described above is not limited to the pure hardware such as CPU, but may comprise firmware, OS, and peripheral devices.

As described above, the configuration of the present invention may be implemented by software or by hardware.

In the contents distribution system, the contents server, the contents receiving apparatus, the contents distribution method, the program and the storage media according to the present invention, the effect that the contents data in the receive range supposed by the contents receiving apparatus can be securely received from the contents server is obtained, whereby the contents distribution system or the like can distribute the contents with the additional information based on the internal attribute of the contents appended. For example, the system is effective in the uses for access restriction by including the user information of the contents data or AV contents data in the additional information to enable. The standard or non-standard protocols other than the HTTP may be also usable.

The invention claimed is:

1. A contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said system comprising:

a contents server having storage unit holding one or more contents, contents data acquisition unit receiving a data request including request range information of contents out of consideration for the additional information, specifying a requested range, and extracting data of contents in said requested range from said storage unit, and transmitting unit transmitting the extracted data of said contents with said additional information appended; and a contents receiving apparatus having receiving unit receiving the data of said contents and said additional information that are transmitted from said transmitting unit, received data decision unit deciding a receiving request range of said contents out of consideration for said additional information, and data request transmitting unit transmitting said data request including decided receiving request range as request range information;

wherein said contents data acquisition unit specifies said requested range according to said data request transmitted by said data request transmitting unit.

2. A contents server for a contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said contents server comprising:

storage unit holding one or more contents, contents data acquisition unit receiving a data request including request range information of contents out of consideration for the additional information, specifying a requested range, and extracting the data of contents in said requested range from said storage unit, and transmitting unit transmitting the extracted data of said contents with said additional information appended.

3. The contents server according to claim 2, wherein said communication protocol is an HTTP, and said data request is provided with an extension header for writing said request range information of said contents out of consideration for said additional information.

4. The contents server according to claim 2, wherein said contents are AV contents including any one of or any combination of video, image and audio.

5. The contents server according to claim 2, wherein said additional information includes information concerning a state of copyright protection of said contents.

6. The contents server according to claim 2, wherein in the case that said contents are encrypted, said additional information includes information for decoding said encrypted contents.

7. A contents receiving apparatus in a contents distribution system for transmitting and receiving contents and additional information in accordance with a communication protocol in which one or more pieces of the additional information corresponding to an internal attribute of said contents are appended to said contents and said contents and said additional information are packetized as a data part without distinction, said apparatus comprising:

received data decision unit deciding a receiving request range of contents out of consideration for the additional information, data request transmitting unit transmitting a data request including request range information indicating said decided receiving request range, and receiving unit receiving the data of said contents and said additional information.

8. The contents receiving apparatus according to claim 7, wherein said receiving unit stores only the data of said contents in a reception buffer according to the received data of said contents and said additional information.

9. The contents receiving apparatus according to claim 7, wherein said communication protocol is an HTTP, and said data request is provided with an extension header for writing said request range information of said contents out of consideration for said additional information.

10. The contents receiving apparatus according to claim 7, wherein said contents are AV contents including any one of or any combination of video, image and audio.

11. The contents receiving apparatus according to claim 7, wherein said additional information includes information concerning a state of copyright protection of said contents.

12. The contents receiving apparatus according to claim 7, wherein in the case that said contents are encrypted, said additional information includes information for decoding said encrypted contents.

13. A contents distribution method of transmitting and receiving contents, employing a contents server in which one or more pieces of contents are stored, and a contents receiving apparatus receiving said contents from said contents server via a network;
making said contents server perform a step of receiving a data request including request range information of contents out of consideration for additional information, specifying a requested range, and extracting data of contents in said requested range, and a step of transmitting the extracted data of said contents with said additional information appended; and
making said contents receiving apparatus perform a step of deciding a receiving request range of said contents out of consideration for said additional information, a step of transmitting said data request including said decided receiving request range as said request range information, and a step of receiving the data of said data of contents and said additional information that are transmitted by said step of transmitting.

14. A storage media usable on a computer, wherein the storage media is storing a program for the contents distribution system according to claim 1, wherein said program enables a computer to implement, for said contents server, storage unit holding one or more contents, contents data acquisition unit receiving said data request including said request range information of said contents out of consideration for said additional information, specifying a requested range, and extracting said data of contents in said requested range from said storage unit, and transmitting unit transmitting the extracted data of said contents with said additional information appended, and to implement, for said contents receiving apparatus, receiving unit receiving the data of said contents and said additional information that are transmitted from said transmitting unit, received data decision unit deciding a receiving request range of said contents out of consideration for said additional information, and data request transmitting unit transmitting said data request including said decided receiving request range as said request range information.

15. A storage media usable on a computer, wherein the storage media is storing a program for the contents server according to claim 2, wherein said program enables a computer to implement, for said contents server, storage unit holding one or more contents, contents data acquisition unit receiving said data request including said request range information of said contents out of consideration for said additional information, specifying a requested range, and extracting said data of contents in said requested range from said storage unit, and transmitting unit transmitting the extracted data of said contents with said additional information appended.

16. A storage media usable on a computer, wherein the storage media is storing a program for the contents receiving apparatus according to claim 7, wherein said program enables a computer to implement, for said contents receiving apparatus, received data decision unit deciding said receiving request range of contents out of consideration for said additional information, data request transmitting unit transmitting said data request including said request range information indicating said decided receiving request range, and receiving unit receiving data of said contents and said additional information.

* * * * *